United States Patent
Kong et al.

(10) Patent No.: US 7,385,944 B2
(45) Date of Patent: Jun. 10, 2008

(54) METHOD OF INTERFERENCE CANCELLATION IN COMMUNICATION SYSTEMS

(75) Inventors: Hongwei Kong, Denville, NJ (US);
Kumud K. Sanwal, Iselin, NJ (US);
Subramanian Vasudevan, Morristown, NJ (US); Yunsong Yang, Piscataway, NJ (US); Henry Hui Ye, Ledgewood, NJ (US); Jialin Zou, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 959 days.

(21) Appl. No.: 10/401,594

(22) Filed: Mar. 31, 2003

(65) Prior Publication Data
US 2004/0192208 A1    Sep. 30, 2004

(51) Int. Cl.
*H04Q 7/00*    (2006.01)
(52) U.S. Cl. .................. 370/328; 370/342; 370/345; 370/441; 370/442; 455/63.1; 455/513; 375/144; 375/346
(58) Field of Classification Search ............. 370/328, 370/329, 345, 349, 342, 209, 335, 441, 442; 455/63.1, 513; 375/144, 346
See application file for complete search history.

(56) References Cited

U.S. PATENT DOCUMENTS

| 6,404,760 | B1 * | 6/2002 | Holtzman et al. | 370/342 |
|---|---|---|---|---|
| 6,405,052 | B1 * | 6/2002 | Faber | 455/522 |
| 6,438,723 | B1 * | 8/2002 | Kalliojarvi | 714/751 |
| 6,463,294 | B1 * | 10/2002 | Holma et al. | 455/513 |
| 6,470,001 | B1 * | 10/2002 | Kim et al. | 370/342 |
| 6,535,497 | B1 * | 3/2003 | Raith | 370/336 |
| 6,711,208 | B2 * | 3/2004 | Razoumov et al. | 375/224 |
| 6,768,727 | B1 * | 7/2004 | Sourour et al. | 370/335 |
| 6,904,079 | B2 * | 6/2005 | Hoffmann et al. | 375/145 |
| 7,020,115 | B2 * | 3/2006 | Chillariga et al. | 370/337 |
| 7,154,846 | B2 * | 12/2006 | Chen et al. | 370/209 |
| 2002/0150040 | A1 * | 10/2002 | Tong et al. | 370/216 |

* cited by examiner

*Primary Examiner*—Ricky Q. Ngo
*Assistant Examiner*—Kibrom T Hailu

(57) ABSTRACT

In a method of canceling interference, a base station selects a known highest data rate user transmission from a received first signal containing a group of user transmissions. The known highest rate user transmission may be configured as one or more frames, each frame including a control preamble and a plurality of encoded sub-frames. The control preamble and encoded sub-frames may be decoded, and the decoded sub-frames may be used for removing interference caused by the known highest rate user transmission to all remaining transmissions of the group.

29 Claims, 7 Drawing Sheets

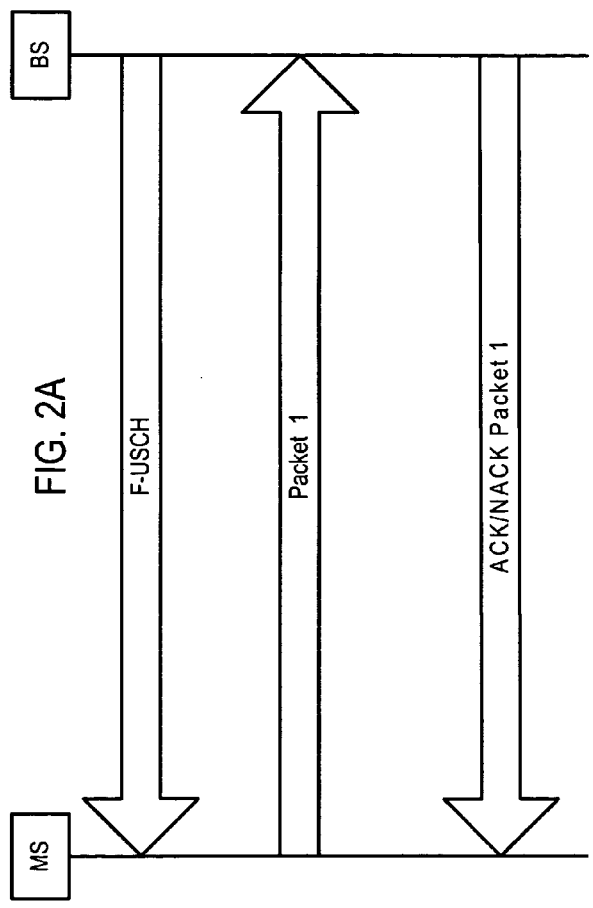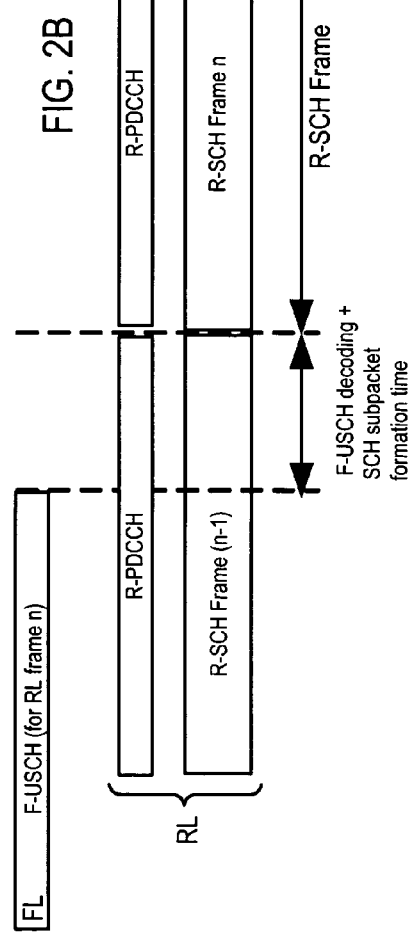

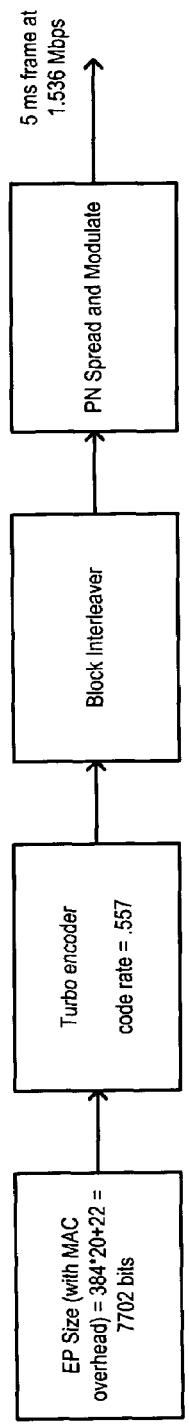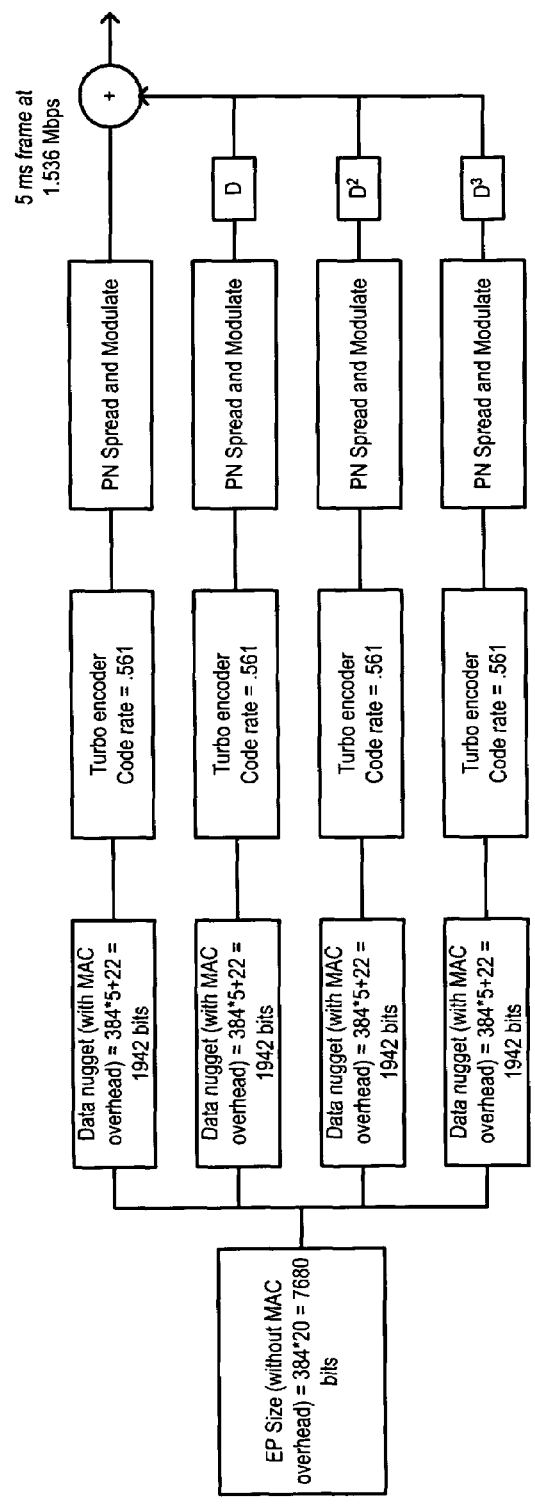
FIG. 7A
FIG. 7B

METHOD OF INTERFERENCE CANCELLATION IN COMMUNICATION SYSTEMS

BACKGROUND OF THE INVENTION

1. Field of the Invention

The present invention generally relates to communications systems, and more particularly to a method for canceling interference in wireless communication systems.

2. Description of Related Art

Numerous interference cancellation technologies have been proposed over the last decade for second generation (Global System for Mobile Communications (GSM)) and third generation (cdma2000, Universal Mobile Telecommunication System (UMTS)) wireless communication systems. These technologies have focused on jointly decoding all user transmissions at a serving base station in either a concurrent or sequential manner. Actual implementation of these solutions have not proven feasible due to computational complexity, as well as performance loss in channel estimation and joint decoding of data from a large number of roughly equal power users. Additionally, these interference cancellation technologies are not backward compatible, and have imposed substantial latencies in the processing of user transmissions received at a base station.

SUMMARY OF THE INVENTION

In a method of canceling interference, a base station selects a known highest data rate user transmission from a received first signal containing a group of user transmissions. The known highest rate user transmission may be configured as one or more frames, each frame including a control preamble and a plurality of encoded sub-frames. The control preamble and encoded sub-frames may be decoded, and the decoded sub-frames may be used for removing interference caused by the known highest rate user transmission to all remaining transmissions of the group.

BRIEF DESCRIPTION OF THE DRAWINGS

Exemplary embodiments of the present invention will become more fully understood from the detailed description given hereinbelow and the accompanying drawings, wherein like elements are represented by like reference numerals, which are given by way of illustration only and thus are not limitative of the exemplary embodiments of the present invention and wherein:

FIGS. 2(a) and 2(b) illustrate a scheduled mode of transmission and reverse link packet transmission timing in accordance with an exemplary embodiment of the invention;

FIGS. 7A and 7B illustrate a prior art supplemental channel format and supplemental channel format in accordance with an exemplary embodiment of the invention.

DETAILED DESCRIPTION OF THE EXEMPLARY EMBODIMENTS

Figure 1:
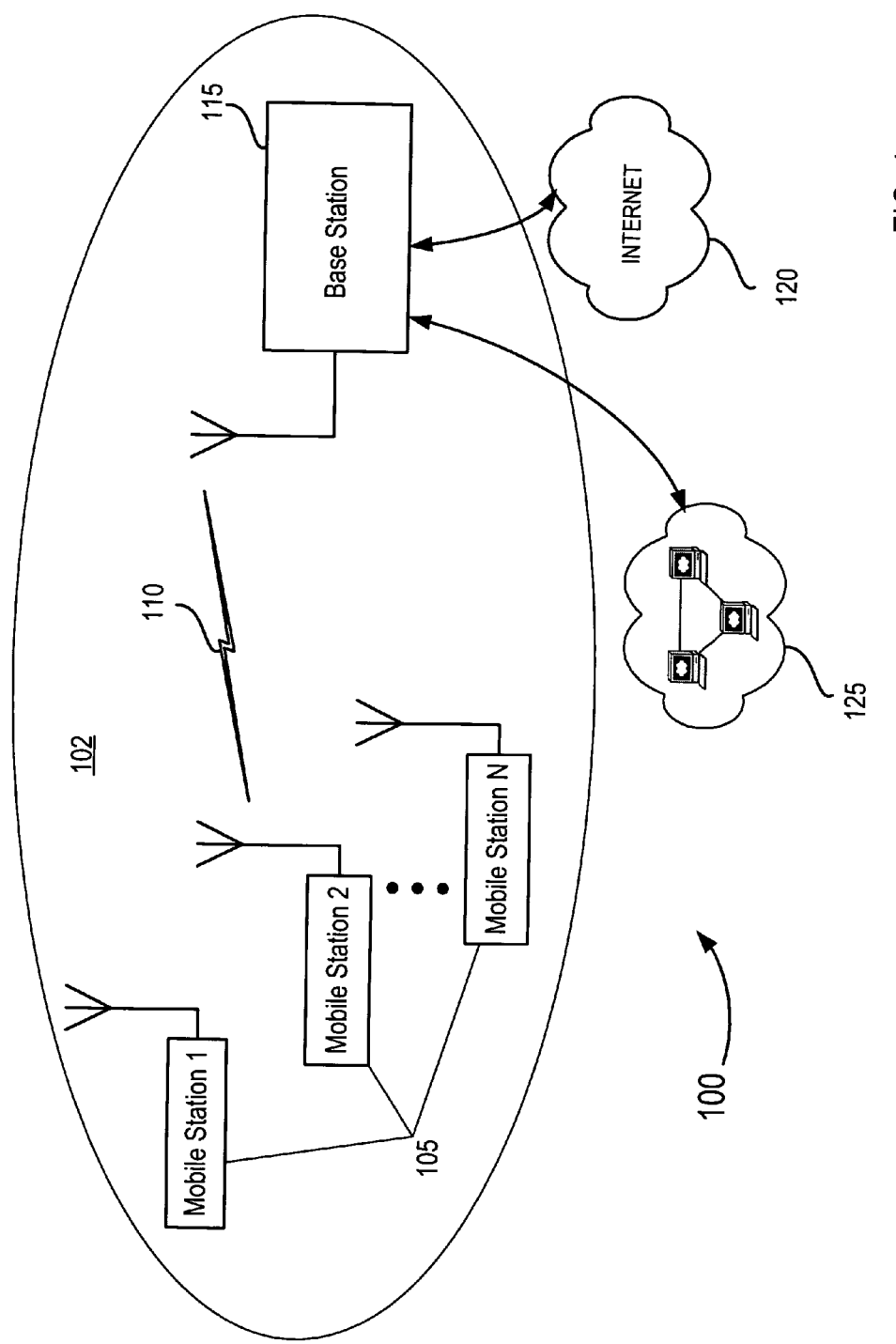
FIG. 1 is a block diagram of an exemplary wireless communication system in accordance with an exemplary embodiment of the invention.

The following description may be described as based on a wireless communication system employing cdma2000 1xEV-DV technology which combines voice and data on a single 1.25 MHz channel in order to provide integrated voice with simultaneous packet data services at speeds of up to 3.09 Mbps on the forward link and a target of 2 Mbps on the reverse link, while being backward compatible with CDMA One and cdma2000 1x. Although exemplary embodiments will be described in this exemplary context, it should be noted that the embodiments shown and described herein are meant to be illustrative only and not limiting in any way. As such, various modifications will be apparent to those skilled in the art for application to other communications systems such as the UMTS High Speed Uplink Packet Access (HSUPA) specification HSUPA, 1xEV-DO High Rate Packet Data (HRPD) specification, formerly know as the High Data Rate (HDR) specification, IEEE 802.16/20 standards, etc., and are contemplated by the teachings herein.

Where used below, a mobile station is a device providing data and/or voice connectivity to a user. A mobile station may be connected to a computing device such as a laptop, personal computer (PC), or it may be a self-contained data device such as a personal digital assistant (PDA). Accordingly, a mobile station is equivalent to, and may be also be referred to as a mobile, wireless mobile, remote station, user, user equipment (UE), subscriber, subscriber user, access terminal or any other remote user of wireless resources in a wireless communications network. Additionally, a base station refers to network equipment providing data connectivity between a packet data network, typically the Internet, and the mobile station. A base station is equivalent to, and may also be referred to as a base transmitter station, base transceiver station, access network, Node-B, access point, or any other equipment providing data connectivity between one or mobiles and a communication system or network. An access network may also comprise one or more base stations.

As used herein, a Reverse Traffic Channel is a traffic channel on which data and signaling are transmitted from a mobile station to a base station, depending on the radio configuration supported by the mobile station, the Reverse Traffic Channel could include a Reverse Fundamental Channel (R-FCH) with combinations of a Reverse Dedicated Control Channel (R-DCCH) and one or more Reverse Supplemental Channels (R-SCHs) or with one or more Reverse Supplemental Code Channels (R-SCCHs). A R-FCH is a portion of the Reverse Traffic Channel which carries higher level data and control information from a mobile station to a base station. In general, a R-SCH is a portion of a Radio Configuration 3 through 6 Reverse Traffic Channel that operates in conjunction with a R-FCH or R-DCCH to provide higher data rate services, and on which higher-level data is generated, and an R-SCCH is a portion of a Radio Configuration 1 and 2 Reverse Traffic Channel that operates in conjunction with a R-FCH or other R-SCCHs to provide higher data rate services, and on which higher-level data is generated.

FIG. 1 is a block diagram of an exemplary wireless communication system 100. System 100, which may be a high data rate communication system employing EV-DV technology in accordance with cdma2000, Revision D, for example, may be generally illustrated by a cell 102 containing one or more mobile stations 105 in communication with, or served by a base station 115. Mobile stations 105 communicate through base station 115 to exchange packet data with the Internet 120 or some other packet data network 125, such as a closed corporate network for example. Examples of packet data may include Internet Protocol (IP) datagrams used for applications such as accessing web pages and retrieving email. Such packet data applications may run on client software of the mobile station 105, or may run on a separate computer device that uses mobile station 105 as a wireless modem. In an exemplary embodiment, mobile stations 105 communicate with base station 115 over an air interface (shown as forward link 107 and reverse link 110), which may be a set of forward and reverse channels for example.

Base station 115 may be a single base station having a base station controller, or may be part of a plurality of separately located wireless base stations and a base station controller connected together in an access network. Each base station has a predetermined number of traffic channels that it can use to exchange data with mobile stations 105. When one of the traffic channels is assigned to a mobile station 105, that mobile station 105 may be referred to as an active mobile station 105. At least one traffic channel is assigned to each active mobile station 105. Base station 115 may be connected with packet data network 120 using any appropriate type of network connection such as wireless or wire-line T1 or T3, fiber optic connection, Ethernet, etc. Base station 115 may be connected to multiple packet data networks having more than one type. For example, another network 125 might be a public switched telephone network (PSTN) connected with base station 115 through a data services interworking function (IWF).

FIGS. 2(a) and 2(b) illustrate a scheduled mode of transmission and reverse link packet transmission timing in accordance with an exemplary embodiment of the invention.

When mobile station 105 is in a scheduled mode of transmission, i.e., in order to support packet scheduling on the reverse link, a scheduling grant containing information about mobile identity and other control information should be sent on the forward link (FL). In the cdma2000 Revision D proposals, a code-multiplexed control channel called a Forward-Uplink Scheduling Channel (F-USCH) carries the scheduling grant on the forward link for the mobile(s) scheduled to transmit in a Reverse Supplemental Channel (R-SCH) frame.

As shown in FIGS. 2(a) and 2(b), mobile station 105 transmits a data packet in the R-SCH frame on the reverse link 110, in response to a scheduling grant message on the forward link 107. In FIG. 2(b), a reverse link control channel may be defined, called a Reverse Packet Data Control Channel (R-PDCCH). The R-PDCCH may be carried for reverse link packet transmissions from the mobile stations 105 that are in soft hand-off with multiple base stations. The control channel normally carries information such as encoder packet format indication (data rate etc.) and Hybrid Automated Repeat Request (HARQ) related information such as ARQ channel ID and subpacket ID etc, and is transmitted with the R-SCH. HARQ allows combining of the original transmission with the new transmission, rather than to discard the original transmission. This greatly improves the probability of correct decoding of the packet.

The word "hybrid" in HARQ indicates that Forward Error Correction (FEC) techniques have been used in addition to ARQ techniques. HARQ combining schemes imply that retransmissions are combined with the original unsuccessful transmissions. Accordingly, HARQ helps to ensure that transmissions resulting in unsuccessful decoding, by themselves, are not wasted.

Figure 3:
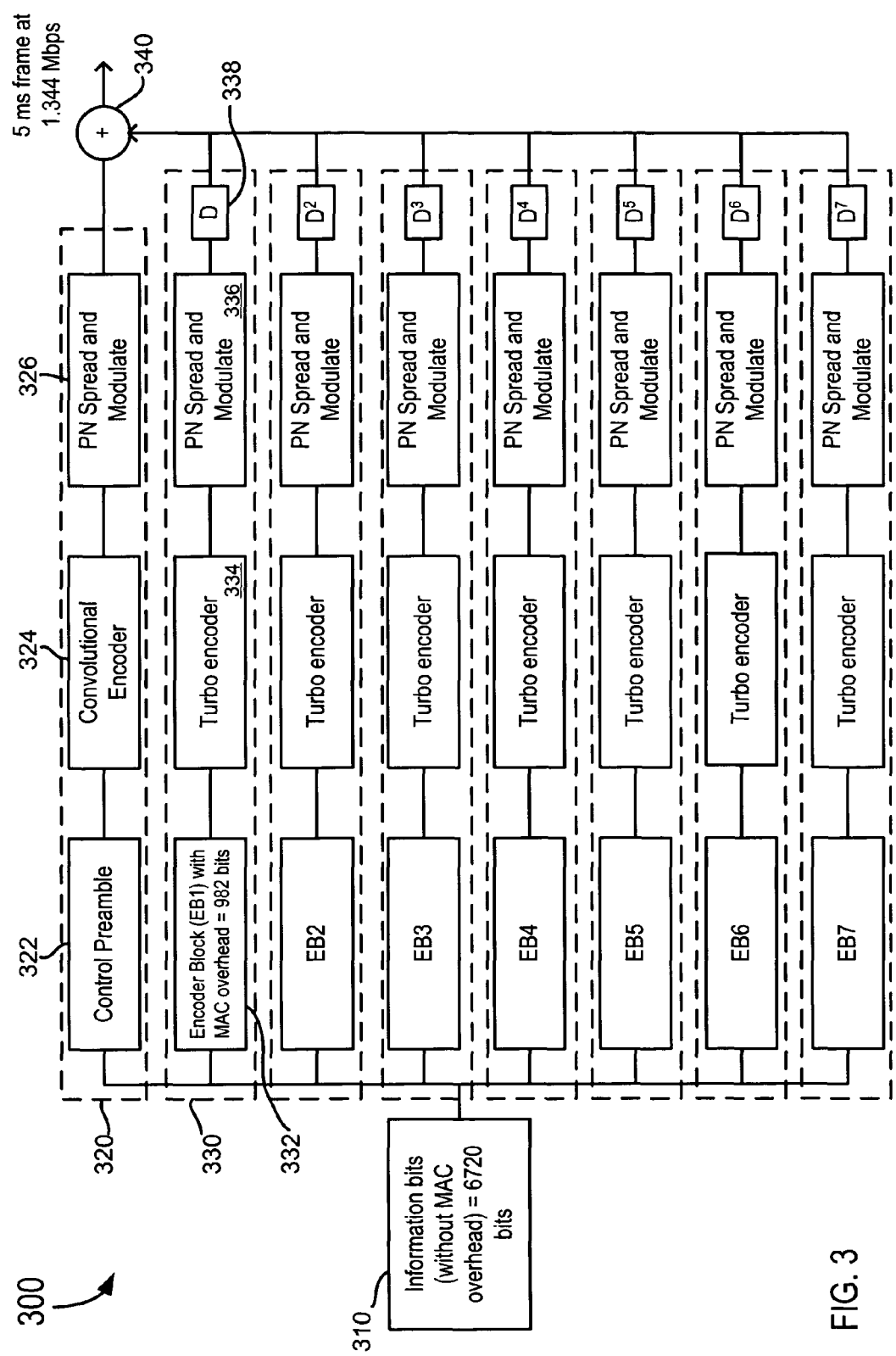
FIG. 3 describes a reverse supplemental channel format in accordance with an exemplary embodiment of the invention.

FIG. 3 describes a reverse supplemental channel format in accordance with an exemplary embodiment of the invention. FIG. 3 illustrates how a five (5) ms long reverse supplemental channel (R-SCH) frame format may be constituted from self-decodable sub-frames 330. The R-SCH frame 300 sub-frames may be capable of being independently decoded every ½ Power Control Group (PCG), where a PCG may represent a 1.25 ms interval or timeslot, for example (½ PCG=0.625 ms). Each R-SCH frame 300 may encode the information (data) bits 310, into a plurality of sub-frames 330 characterized by an encoder block 332 which adds an independent CRC code bit field, turbo encoder bits 334, pseudo-noise (PN) Spreading and Modulation codes 336 and a delay of n*½ PCG represented as "D'''" (338) in FIG. 3. PN spread refers to the combination of multiple spreading codes, including Walsh codes.

As discussed above, each sub-frame 330 of a R-SCH frame 300 may include self-decodable, ½ PCG-long encoder blocks (EBs) 332. Self-decodable means that each EB 332 may have an independent CRC code, so as to provide a selective retransmission protocol for the sub-frames 330 to maximize HARQ gain, as will be described in further detail below. In FIG. 3, the smallest self-decodable block is ½ PCG and there are seven EBs 332 per R-SCH frame 300. An alternative embodiment of an R-SCH 300 may consist of eight (8) EBs 332, with the first EB transmitted concurrently with the control preamble 320.

The first ½ PCG of the R-SCH frame 300 may be allocated to a control preamble 322. A control preamble 322 is a low-rate transmission that may perform two functions. First, the control preamble 322 serves as a specification of the format of the subsequent EBs 230, supports H-ARQ operation, etc. Second, post-decoding, it is provides a supplemental pilot reference for the first (and potentially subsequent EBs). The received control preamble 322 may include the channel gain and phase applied to the modulated coded data symbols carried within the control preamble 322. Once the data symbols are decoded, they may be re-encoded, re-modulated and divided into the received control preamble 322. This operation recovers the channel gain and phase and may be referred to as a supplemental pilot reference, for example. The control preamble 322 may be carried by a portion of, or entirety of the same Walsh code space that is used by the EBs 332. When the control preamble 322 and an EB 332 are sent concurrently, they share the available Walsh space. The control preamble may thus accompany one or more of the encoded sub-frames 330.

Table 1 illustrates a rate set associated with the R-SCH format of FIG. 3. A means to indicate that the mobile station 105 is to use a "stealth mode" R-SCH format is provided on the schedule-grant channel transmitted on the downlink, or the F-USCH. Hereinafter, the R-SCH in accordance with the exemplary embodiments of the present invention may be occasionally referred to as in a "stealth mode". Certain high data rate mobile station transmissions may be referred to as stealth transmissions, and a mobile station as a "stealth MS".

TABLE 1

Stealth Mode R-SCH formats

| Information bits per 5 ms frame | Frame Duration (ms) | Effective Data Rate (bps) | Encoder Block Size (7 per frame) |
|---|---|---|---|
| 6720 | 5 | 1344000 | 982 |
| 5376 | 5 | 1075200 | 790 |
| 4032 | 5 | 806400 | 598 |
| 2688 | 5 | 537600 | 406 |

Stealth Mode Conventions

The exemplary embodiments of the present invention are directed to an interference cancellation method that may be based, in part, on a premise that if a transmission from a single user that dominates the rates and received powers of all other users in a particular group (at a base station receiver antenna) is scheduled (e.g., a scheduled user) at a known rate and at a known power by a base station, then the received signal from that user, hereinafter referred to as a "stealth signal", may be estimated and subtracted off reliably from a composite signal received at the base station receiver. The composite signal contains all legacy user transmissions (e.g., voice and data transmission of the mobile stations 105 in cell 102, for example). Voice users are not scheduled, and data users may or may not be scheduled. Thus, the composite signal contains more than simply the data transmissions from scheduled users. The base station 115 receives a single composite signal, essentially a linear combination of all the users' transmissions, where each user's transmission has been affected differently by the channel between the user (mobile station 105) and the base station 115 receiver. Multiple copies (e.g., fingers) of this composite signal may be received if there are multiple receive antennas at the base station 115, for example.

The removing or canceling of the stealth signal from the composite signal is intended to remove any interference in the highest data rate user transmission ("dominant user's signal"). Since processing of other users' transmissions in the group or cell 102 is subsequent to interference cancellation of the dominant user's signal, effective signal-to-noise ratios for these users may show little degradation due the presence of this dominant or "highest data rate supporting" user. The stealth signal is physically present at the base station 115 receiver antenna, but the other legacy user transmissions in the composite signal do not experience the interference from the stealth signal at the base station 115. Hence the signal is "cloaked", i.e., a stealth signal.

Figure 4:
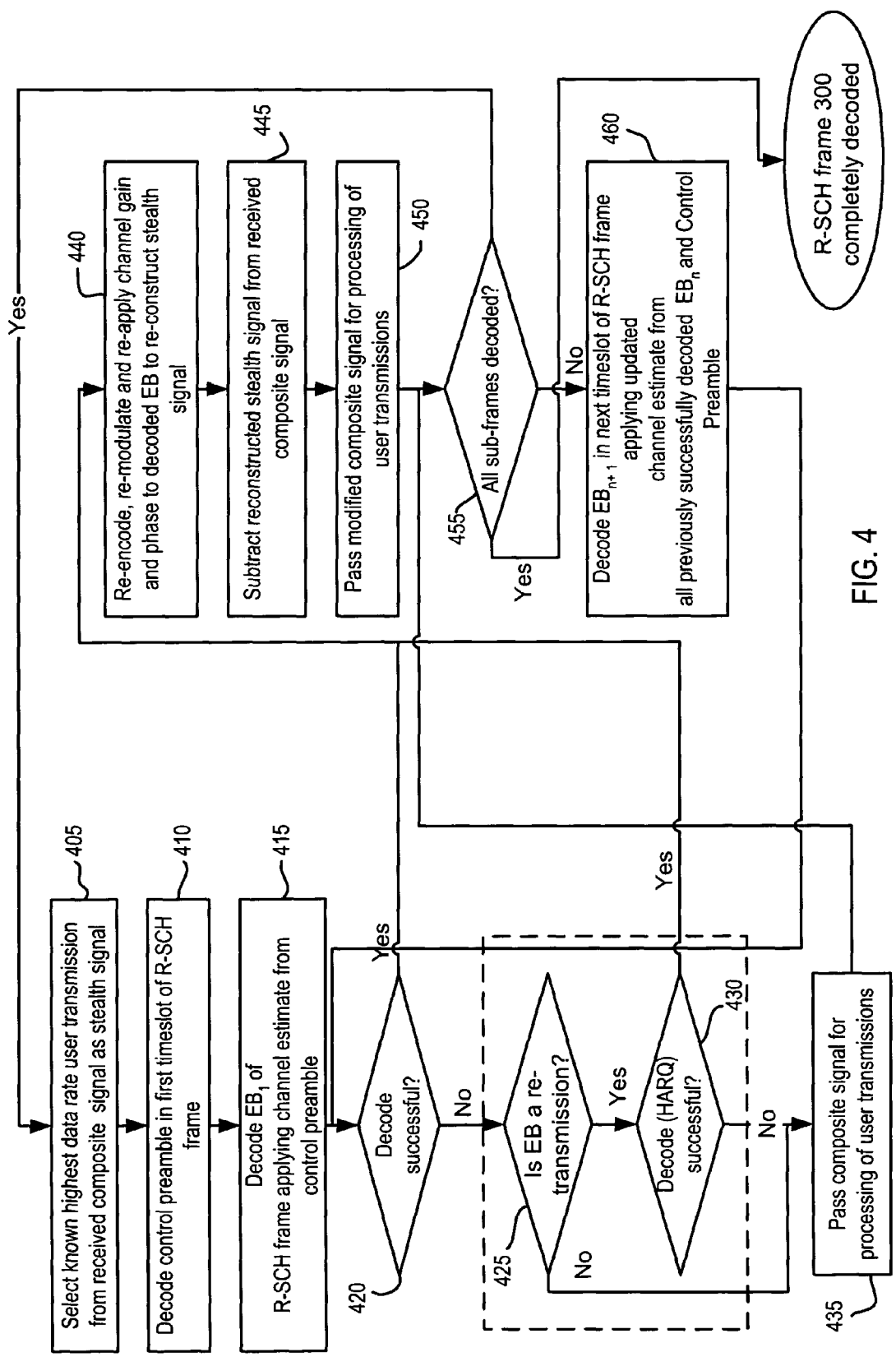
FIG. 4 is a flowchart describing a method of canceling interference in accordance with an exemplary embodiment of the invention.

FIG. 4 is a flowchart describing a method of canceling interference in accordance with an exemplary embodiment of the invention. Base station 115 receives a sub-chip rate input stream from the plurality of mobiles 105 of the cell 102 via each receive antenna at the base station 115, which is embodied as a composite signal containing a combination of all the mobiles' 105 transmissions, where each mobile's transmission may have been affected differently by the reverse traffic channel between the user (mobile station 105) and the receiver antenna of the base station 115. The composite signal may be temporarily buffered in the receiver of the base station 115, for later subtraction of a reconstructed stealth signal of the highest rate user transmission of the group (mobiles 105 of cell 102) for example.

Occasional reference should also be made to FIG. 1 and to the R-SCH format of FIG. 3 for the following discussion. Referring to FIG. 4, the base station 115 initially selects (function 405) a known highest data rate user transmission (e.g., the stealth transmission) from the composite signal as the stealth signal. The base station knows which mobile station 105 can support the highest data rate, or which mobile stations 105 in the cell 102 can transmit the highest rate transmission, based on the scheduling grant message sent over the F-USCH to the mobile stations 105 of the cell 102.

This stealth transmission mode follows CDMA precepts of interference control, interference reduction and interference management. All user transmissions (whether high rate or low rate) are power allocated. Power assignment to high-rate users is based on and does not exceed the power requirement for achieving certain target frame error rate (FER) for the assigned rate. The target FER for the stealth user—e.g., the mobile station 105 supporting the highest data rate transmission, is set at a certain low level such as 0.1% to maintain accuracy of interference estimation and eventual subtraction, or canceling of the stealth signal from the composite signal. Reverse link resources may include the "stealth" mobile station 105's transmit power and the total received power at the base station 115. The total received power at the base station 115 includes the total transmit power of all mobile stations 105 being served by the base station 115 at that particular instant.

The total received power at the base station 115 is typically scaled by a measure of the thermal noise power at the base station receiver (called Rise over Thermal or RoT). A larger RoT value indicates higher "load" at the base station 115. In other words, for example, interference seen by reverse link voice users, and at neighboring base stations, is higher for a higher value of RoT. Therefore, it is desirable to maximize the total reverse link data rate from all users, subject to the RoT being below an allowable threshold. In the stealth mode of operation, the net received power at the base station 115 (and hence the RoT) may increase, even substantially, but the effective RoT perceived by legacy (e.g., voice and data) users is increased marginally, if at all. This is because the legacy channel transmissions are processed after canceling the stealth signal from the composite received signal.

The highest rate user transmission, e.g., the stealth signal, is configured as one or more R-SCH frames 300 that include the control preamble 322 and plurality of encoded sub-frames 330 (see EBs 332, EB1 to EB7 in FIG. 3). The control preamble 322 may be separately transmitted in a Reverse Packet Data Control Channel (R-PDCCH) that is decoded (function 410) in the first ½ PCG timeslot to determine a channel phase and gain estimate for the sub-frame 330 containing EB1 332. As will be seen below, in the stealth mode, the R-SCH frame 300 serves as its own pilot with each EB 332 (and control preamble 322) providing channel gain and phase estimates for successive EBs 332. The control preamble (which occupies the first ½ PCG timeslot of the R-SCH frame 300) uses the channel estimates provided by the existing reverse pilot channel (R-PICH) of the stealth mobile station 105. After this decoding operation, the control preamble 322 is re-encoded, and channel estimated for the duration of its transmission.

This channel phase and gain estimate from the control preamble 322 is input to the channel predictor at the base station 115, providing the channel estimate for use in decoding EB1 (function 415) in the current or next ½ PCG timeslot. In a similar manner, and as will be seen in further detail below, successful decoding of each previous encoder block will be used to assist in predicting the channel estimates required for decoding subsequent EBs.

Alternatively, channel gain and phase estimates of sufficient quality may be provided by transmitting the pilot channel with increased power (as is done currently in 1x), or further the pilot channel may be augmented with some other channel (such as a supplemental pilot channel or supplemental control channel) providing additional channel estimates, for example.

Referring to FIG. 4, if the subsequent decoding of EB1 332 is unsuccessful (output of function 420 is NO) then a check is made (function 425) to determine if EB1 is a retransmission. Functions 425 and 430 may be optionally performed, as indicated by the dotted line box in FIG. 4. If output of function 425 is NO, the composite signal is passed (function 435) to the base station 115's upstream processing (at the network) for processing of the user legacy (voice and data) transmissions received from mobiles 105.

The reason for this is that channel estimation and hence interference cancellation in accordance with the exemplary embodiments of the present invention operate post-decoding on CRC protected channels (EBs 332). In the case of a CRC check failure (an unsuccessful decode), use of the decode result may result in poor channel estimation or interference subtraction. Thus, in cases where a CRC check fails, channel estimation and interference cancellation based on the incorrect decode may make the channel estimates more noisy, or amplify the interference from the stealth mobile to legacy users (e.g., interference to transmissions of the other mobile stations 105 in cell 102 that are contained in the received composite signal). Accordingly, channel estimation and interference cancellation operations are not performed on the composite signal prior to passing it on for legacy (voice and data) transmission processing.

If EB1 is a retransmission (the output of function 420 is YES), an attempt is made to decode EB1 along with the previous transmission(s) of EB1 under the HARQ protocol. If this decode is not successful (the output of function 430 is NO) the composite signal is passed upstream for legacy transmission processing (function 435). In an alternative embodiment, functions 425 and 430 are omitted and an unsuccessful decode at function 420 may cause the base station 115 to pass the composite signal upstream (function 435).

If EB1 is successfully decoded (output of functions 420 or 430 is YES), the decoded EB1 is re-encoded using turbo encoder 334, and re-modulated using PN spread and modulate codes 336 and the estimated channel gain and phase to re-constitute the stealth signal (function 440). A portion of the stealth signal may be incrementally reconstructed, e.g., on a sub-frame basis, for example, with each successively decoded encoder block 332, for example. Further, this "incremental portion" of the stealth signal may be incrementally subtracted from the composite signal that has been temporarily buffered. In other words, the decoded EBs 332 may be used to reform the stealth signal in an incremental manner. Accordingly, the stealth signal is subtracted (function 445) from the received composite signal to remove interference from this highest rate user transmission (e.g., the stealth mobile station 105) so that the interference would not interfere with all remaining legacy (voice and data) transmissions of the group or cell 102.

Thus, the removing or canceling of the stealth signal from the composite signal is intended to remove any interference from the highest data rate user transmission ("dominant user's signal"). Since processing of other mobile stations 105 transmissions in the composite signal is subsequent to interference cancellation of the stealth mobile station' 105 signal, effective signal-to-noise ratios for the other mobile station 105 transmissions may show little degradation due the presence of the stealth mobile station's 105 signal.

The modified composite signal may thus be passed (function 450) upstream to the network (such as the Internet, for example) for processing of the legacy user (mobile stations 105) transmissions contained therein. It is determined (function 455) whether all sub-frames 330 have been successfully decoded. If not (output of function 455 is NO), then an updated channel phase and gain estimate from EB1 is input to the channel predictor at the base station 115 that provides the channel estimate to be used for decoding EB2 (function 460) in a next ½ PCG timeslot on R-SCH frame 300. This may be repeated for remaining sub-frames 330 (e.g., EB2 to EB7) using channel phase and gain estimates from all previously decoded sub-frames 330, until the R-SCH frame 300 representing the stealth signal has been fully decoded (output of function 455 is YES).

Aspects related to timing advance of stealth transmissions and control signaling on the forward link (base station to mobile station) for stealth timing adjustment, aspects of the control preamble, and a HARQ selective retransmission protocol are now described in further detail.

Timing Advance of Stealth Transmissions

R-SCH frames 300 from different stealth mobile stations 105 selected by the base station 115 can arrive at the base station 115 receiver antenna with different delays, depending on the mobiles' location within the cell 102. Synchronized reception of the stealth transmission can help to reduce an overlap between different mobile's stealth transmissions (e.g., overlap between a trailing edge of one R-SCH frame 300 in one 5 ms interval with a leading edge of a following R-SCH frame 300 in the next 5 ms interval) that may be due to different round-trip delays. One approach is to use control signaling on the forward link to time-align the transmissions of stealth signals from the stealth-enabled mobile stations 105, so that they arrive at the base station 115 close to base station Universal Time (UT). Control signaling to time-align stealth transmissions may be sent periodically on the forward link at a frequency of 1 per second, or the timing advance information can be sent only to the scheduled stealth mobile by using the schedule grant channel (F-USCH), since the timing advance only impacts the mobile that is scheduled for transmission at a stealth rate. In the latter case, the overhead may be reduced.

Timing advances may be made in units of ⅛ chip, for example, and up-to 128-chip timing advance may be anticipated for cell sizes of cells 102 where interference cancellation in accordance with the present invention may be likely to be enabled. Timing advance may be enabled by the base station 115 as a two-step process: a coarse process and a fine process.

A coarse timing advance advances the R-SCH frames 300 (and R-PDCCH frames, which carries the control preamble 322) alone. Thus, these frames become offset relative to the legacy (e.g., voice and data) channel frames such as the reverse pilot channel (R-PICH), the reverse fundamental channel (R-FCH) which carries voice frames, the reverse channel quality indicator channel (R-CQICH), and the reverse acknowledgement channel (R-ACKCH) both supporting forward link packet data operation. The offset may be chosen so as to be an integer multiple of the Walsh code used to carry R-SCH modulation symbols, and may be included in the PN Spread and Modulate codes 336 in FIG. 3. When the R-SCH frame 300 is shifted in this manner, orthogonality of R-SCH and legacy channels being concurrently transmitted by the user may be maintained.

For example, the R-SCH may be carried on a W-4, or a Walsh code that spans 4 chips. Thus the coarse timing advance of the R-SCH would occur in integer multiples of 4 chips. Coarse timing advance does not require time re-synchronization at the base station 115 receiver, and also does not interrupt the link between mobile 105 and base station 115 for legacy channels for any interval of time.

A fine timing advance may be made for all channels (R-SCH and legacy channels, including the pilot channel). The fine timing advance may be specified in multiples of a fractional chip duration, such as ⅛ chip for example, to specify a time-span up to the coarse advance time step. Referring to the earlier example, an upper limit of the fine timing-advance could be 3.75 chips, made in fractional chip increments. The timing advance communicated by the base station 115 may be any combination of coarse and fine time advance, may omit the fine timing advance and perform only a coarse advance, etc.

Control Preamble

If the mobile station 105 selected as the stealth mobile can disobey the scheduling grant message received over the F-USCH (which is needed to ensure the 0.1% target FER when the base station 115 mis-tracks the mobile station's 105 available power), the packet format needs to be known to the base station receiver as soon as possible. A code division multiplexed (CDM) control channel with the same time span as the R-SCH frame 300 could add too much delay. This is why in the stealth mode, the reverse control channel (R-PDCCH) is specified as a control preamble 322 occupying the first ½-PCG timeslot of the R-SCH frame 300. This is an example of time division multiplexing (TDM), since there is no EB 332 in the same timeslot.

Referring to FIG. 3, there are only seven EBs per frame instead of eight, however, the transmit power during the first ½ PCG time slot will be substantially less than the other time slots of the 5 ms R-SCH frame 300, so that any impact of overlap between stealth transmissions is reduced, and the first ½ PCG timeslot in the R-SCH frame 300 becomes an effective guard time.

Alternatively, the control preamble 322 may be code division multiplexed (CDM) with a smaller encoder block in the first ½ PCG timeslot, allowing additional data to be carried during this time-interval. In other words, the sharing of an EB 332 with the control preamble 322 in one timeslot may allow an additional encoder block per R-SCH frame 300, for a total of eight encoder blocks. If stealth transmissions are well-synchronized (e.g. at ⅛ chip level), a guard-time is unnecessary in this alternative approach. Otherwise, if the synchronization is done at a coarse level (e.g., coarse timing adjustment in integer multiples of the R-SCH Walsh spreading code length of 4 chips), the scheduled stealth mode can gate off the last 4 chips of the 5 ms frame to avoid an overlap between the strongest fingers of two successive stealth transmissions from two different mobiles.

HARQ Selective Retransmission Protocol

In general, the HARQ selective retransmission protocol allows for individual encoder blocks that have errors to be re-transmitted with a next 5 ms R-SCH frame 300, instead of requiring the entire R-SCH frame 300 to be re-transmitted, hence, selective re-transmission, For example, assuming a 5 ms R-SCH frame 300 is encoded with eight ½-slot encoding blocks 332, then the next time the base station 115 schedules a selected stealth mobile station 105 for a new stealth transmission, the B1~B8 field on the schedule grant channel (F-USCH) is set to '00000000' to indicate a new transmission. If the base station 115 received the control preamble 322 correctly, but doesn't receive some or any EBs 332 correctly, the B1~B8 field on the F-USCH will be used to indicate which EB 332 needs to be re-transmitted by setting that bit to "1". So, a non-all-zero B1~B8 field indicates there is at least one EB 332 for retransmission. In the case of limited available bits on F-USCH, a fewer number of bits, for example four bits (B1~B4), could be used to map the need for retransmission for (EB1 and EB2, EB3 and EB4, . . . ).

Table 2 illustrates an exemplary F-USCH field, where B1-B8 represent bit fields allocated for each sub-frame 330 (hence each EB 332) of the R-SCH frame 300, and "other field" represents the scheduling grant information for the mobile stations 105.

TABLE 2

| F-USCH Field | | | | | | | | |
|---|---|---|---|---|---|---|---|---|
| B1 | B2 | B3 | B4 | B5 | B6 | B7 | B8 | Other Fields |
| New/Re-Tx for EB 1 | New/Re-Tx for EB 2 | . . . | | | | | | . . . |

Figures 5A, 5B:
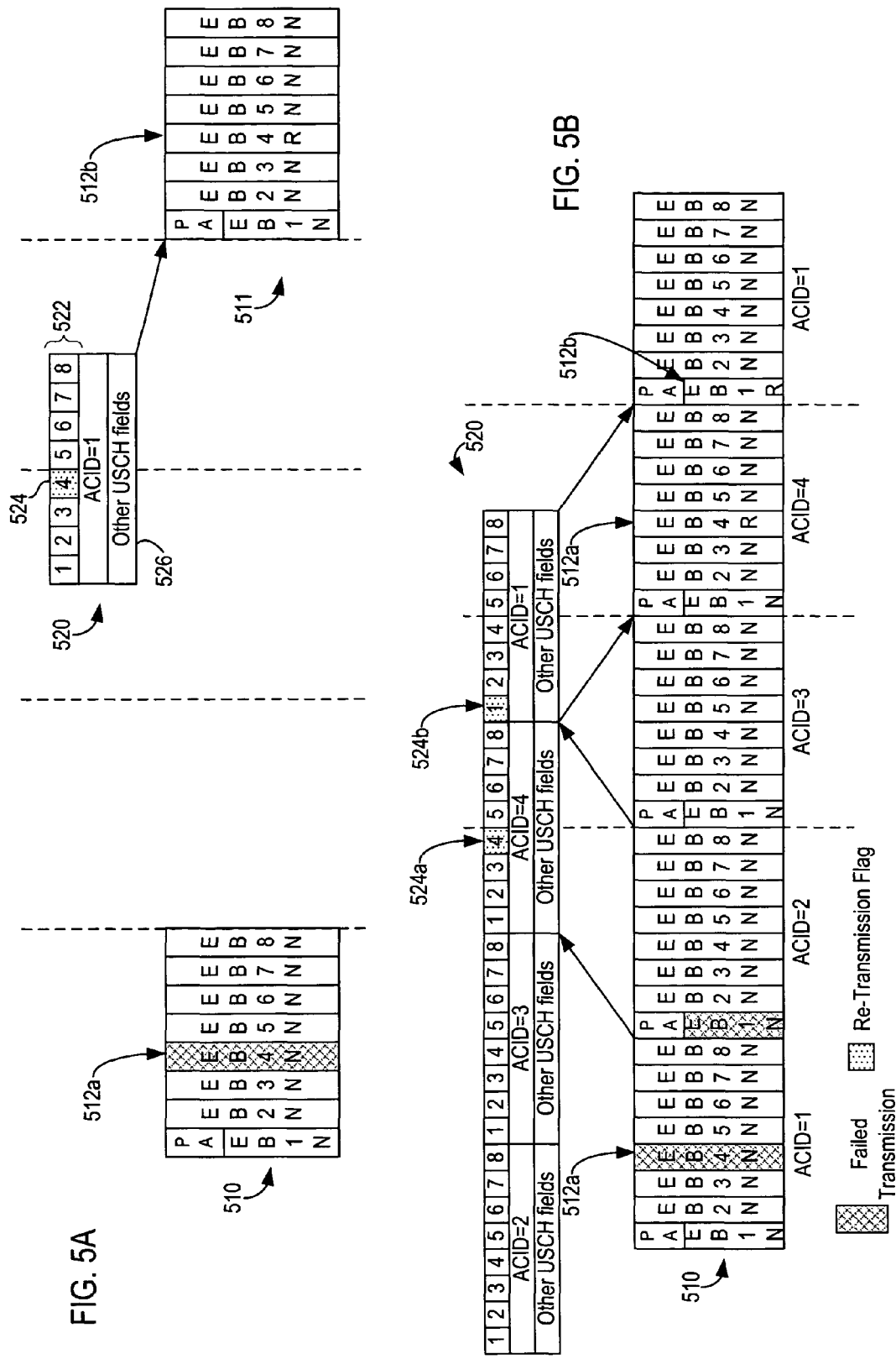
FIGS. 5A and 5B illustrate a HARQ protocol for selective retransmission in accordance with an exemplary embodiment of the invention.

FIGS. 5A and 5B illustrate a HARQ protocol for selective retransmission in accordance with an exemplary embodiment of the invention. FIG. 5A illustrates a HARQ operation with one ARQ channel being used; FIG. 5B illustrates a HARQ operation with four ARQ channels being used. In FIGS. 5A and 5B, "PA" represents the control preamble 322 (R-PDCCH), "EB" is an encoder block, "ACID" is the ARQ channel ID, "N" is a new transmission, "R" is a retransmission, and different shadings represent a failed transmission in a R-SCH frame 510 and a retransmission flag set in a HARQ feedback field 522 of a F-USCH 520.

In FIG. 5A, encoder block 512a (EB4) of R-SCH frame 510 has errors, i.e., the CRC check fails and this encoder block cannot be decoded by the base station 115. Accordingly, base station 115 sends a scheduling grant message on F-USCH 520 for ACID 1 (which is the only ARQ channel being used) that includes a retransmission flag 524. This tells the mobile station 105 that EB4 in the previously received 5 ms R-SCH frame 510 had errors, and requests that the mobile station re-send EB4 in the next 5 ms R-SCH Frame 511. As shown in FIG. 5A, EB4 is resent as encoder block 512b of R-SCH 511. FIG. 5B shows a similar operation for two EBs, one that fails (EB4)on an R-SCH 510 having an ACID=1, another (EB1) that fails on an R-SCH frame 511 having an ACID=4. This information is fed back to the mobile station 105 via flags 524a and 524b in the HARQ feedback fields 522 of the F-USCH 520, for retransmission on subsequent R-SCHs 514 and 515. In FIGS. 5A and 5B, the R-SCHs are shown with the control preamble 322 code division multiplexed (CDM) with the first encoder block 332 (EB1).

Figure 6B:
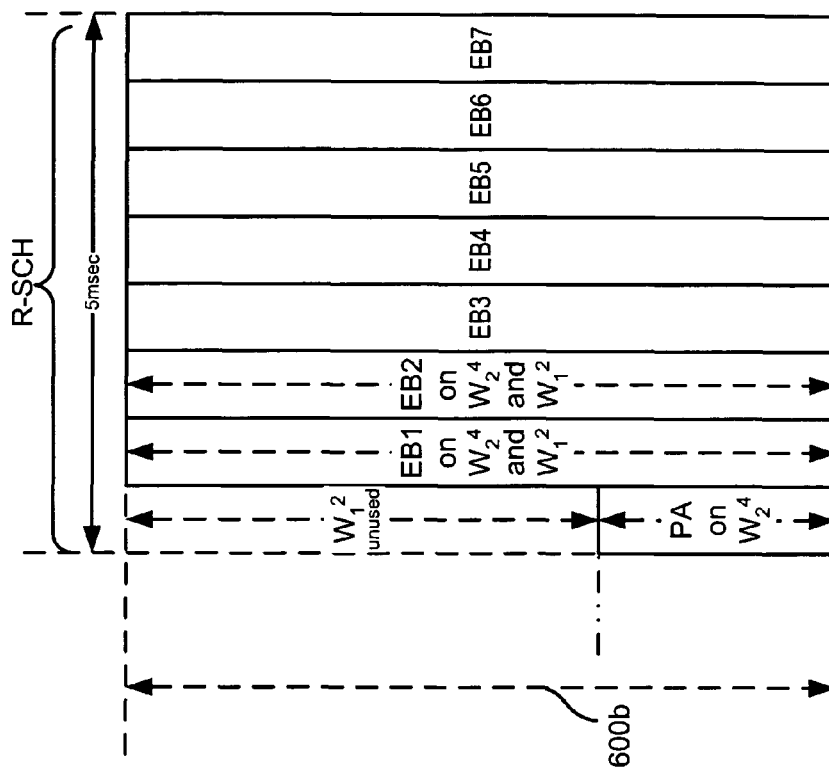
FIGS. 6A and 6B illustrate code division multiplexing and time division multiplexing of a control preamble in accordance with and exemplary embodiment of the invention.
Figure 6A:
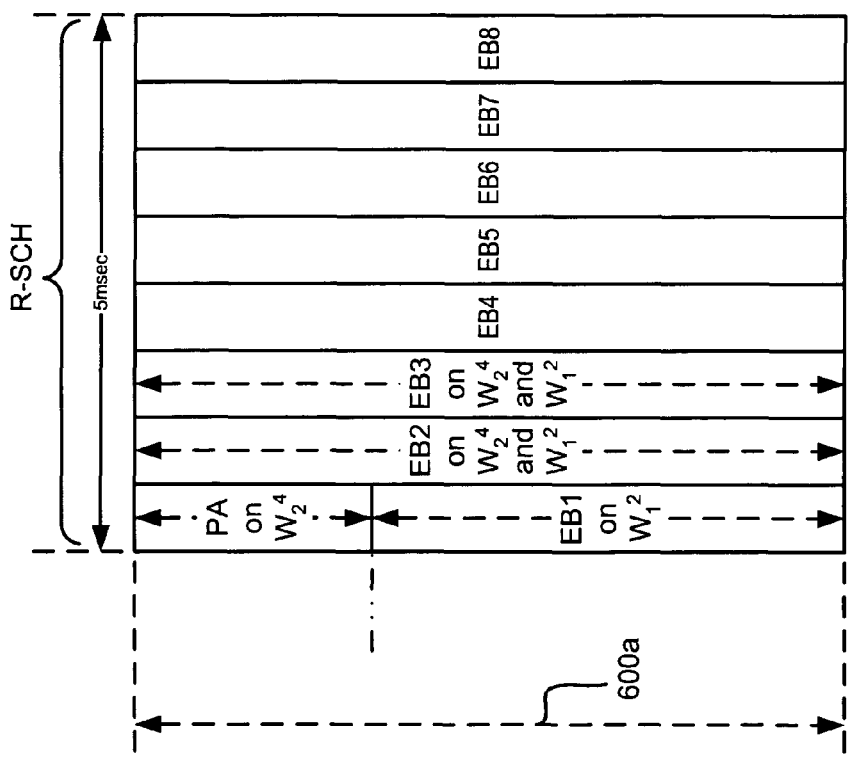

FIG. 6A illustrates code division multiplexing (CDM) of a control preamble in accordance with and exemplary embodiment of the invention. FIG. 6B illustrates time division multiplexing of a control preamble in accordance with and exemplary embodiment of the invention. In FIGS. 6A and 6B, elements 600a and 600b represent a Walsh code space and power allocation, with "PA" representing the control preamble 332 of R-SCH 300, "EB" the encoder blocks 332 of R-SCH 300 and $W_x^i$ representing a typical Walsh code convention. Walsh space and allocated power 600a are shared between the control preamble PA and EB1 in the CDM format of FIG. 6A. EB1 is absent in the first timeslot in the TDM format of FIG. 6B and only the control preamble is carried in this timeslot.

FIGS. 7A and 7B illustrate a prior art supplemental channel format and supplemental channel format in accordance with an exemplary embodiment of the invention. For simplicity of illustration, 1 PCG long encoder blocks (EBs) are considered, and the control preamble is not included. The stealth SCH format differs from the 1x format in that there is no interleaver post-encoding that spans the entire frame duration. Intervleaver post-encoding would not permit decoding of sub-frames prior to the end of the frame, which could introduce substantial latencies.

The exemplary embodiments of the present invention therefore offer a method of interference cancellation in user transmissions received over a reverse link in a communication system, such as a system operating according to cdma2000 Revision D, for example. The interference cancellation techniques may be based in part on a premise that if a transmission from a single user is scheduled at a known rate and at a known power by a base station (e.g., a scheduled user) that dominates the rates and powers of all other users in a particular group (at a base station receive antenna), then the received signal from that user may be estimated and subtracted off reliably from a composite signal received at the base station receiver. Since processing of other users' transmissions in the group is subsequent to interference cancellation of the dominant user's signal, effective signal-to-noise ratios for these users may show little degradation due the presence of this dominant, or "highest data rate supporting" user.

The exemplary embodiments of the present invention may enable interference cancellation with minimal (in some cases, possibly zero) additional latency in the processing of a user's transmission. As discussed above, several aspects in accordance with the exemplary embodiments may enable the base station to perform this interference cancellation with minimal additional latency. A five (5) ms long reverse supplemental channel (R-SCH) frame format may be employed. The frame may be capable of being independently decoded every ½ Power Control Group (PCG), where a PCG may represent a 1.25 ms interval or timeslot, for example (½ PCG=0.625 ms). Control signaling may be used on the forward link (base station to mobile) to time-align one-at-a-time "stealth mode" transmissions of different users, in order to compensate for different round-trip propagation delays for near-in and far-out users in a cell containing the group, for example.

Decoding results for previously received sub-frames (decoding results of the encoder blocks (EBs)) may be used by the base station to yield channel phase and gain estimates for a current sub-frame, which may alleviate a need for a supplemental pilot (or pilot boost), as is currently required for high data-rate R-SCH transmissions. Additionally, each encoder block within an R-SCH frame may be self-decodable (i.e., each EB may have an independent CRC code), so as to provide a selective retransmission protocol for the sub-frames to maximize H-ARQ gain The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. A method of canceling interference in transmissions from a group of users in a communication system, comprising:

selecting a known highest data rate user transmission of the group from a received first signal containing the group's transmissions, the highest rate user transmission representing a second signal configured as one or more received frames, each frame including a control preamble and a plurality of encoded sub-frames;

first decoding the control preamble in a first timeslot to determine a channel phase and gain estimate for a first one of the plurality of encoded sub-frames; and second decoding the first encoded sub-frame in a next timeslot using the determined channel phase and gain estimate to provide a revised channel phase and gain estimate, the second decoding repeated for remaining encoded sub-frames using determined channel phase and gain estimates from all previously decoded sub-frames; and removing interference due to the highest rate user transmission from the first signal using the decoded sub-frames.

2. The method of claim 1, wherein the control preamble precedes the plurality of encoded sub-frames.

3. The method of claim 1, wherein the control preamble accompanies one or more of the plurality of encoded sub-frames.

4. The method of claim 1, wherein
the highest rate user transmission represents a second signal composed of one or more frames containing the control preamble and plurality of encoded sub-frames, and
the removing further includes:
re-forming the second signal from the decoded sub-frames; and
subtracting the second signal from the received first signal to remove interference due to the highest rate user transmission from the first signal.

5. The method of claim 4, wherein the re-forming further includes re-encoding, re-modulating, and re-applying the channel gain and phase to each of the decoded sub-frames to form the second signal.

6. The method of claim 4, wherein
the re-forming further includes re-encoding, re-modulating, and re-applying the channel gain and phase to a decode sub-frames to incrementally form a portion of the second signal on a sub-frame basis; and
the subtracting further includes incrementally subtracting the portion of the second signal from the received first signal.

7. The method of claim 4, wherein the subtracting forms a modified first signal containing voice and data transmissions of a group of scheduled and unscheduled users, the method further comprising:
processing the modified first signal to decode the voice and data transmissions of the group.

8. The method of claim 4, wherein the subtracting yields a modified first signal including all remaining voice and data transmissions of the group and a substantially negligible signal component from the highest data rate user of the group.

9. The method of claim 1, wherein the frame is received over a reverse supplemental channel (R-SCH) as a plurality of encoder blocks preceded by the control preamble, each encoder block being self-decodable.

10. The method of claim 9, wherein each self-decodable encoder block includes a cyclic redundancy code (CRC).

11. The method of claim 1, wherein each frame is encoded with a control preamble and eight encoded sub-frames in ½ Power Control Group (PCG) time slots.

12. The method of claim 11, wherein the control preamble is subject to code division multiplexing with a encoded sub-frame in one or more of the ½ PCG time slots.

13. The method of claim 11, where a first and a last ½ PCG timeslot contains a guard time to reduce overlap between successive second signals.

14. The method of claim 1, wherein each frame is encoded with a control preamble and seven encoded sub-frames in ½ Power Control Group (PCG) time slots.

15. The method of claim 14, wherein the control preamble is subject to time division multiplexing in a first ½ PCG timeslot.

16. The method of claim 14, wherein the first timeslot is a guard time to reduce overlap between two or more second signals.

17. The method of claim 1, wherein the first signal includes a plurality of sequential high data rate user transmissions, the method further comprising:
  time-aligning the sequential high data rate user transmissions so as to prevent overlap between leading and trailing edges of sequential high-data rate transmissions.

18. The method of claim 1, wherein the first signal includes a plurality of concurrent high data rate user transmissions, the method further comprising:
  time-aligning the concurrent high data rate user transmissions so that only one high data rate user transmission is selected as the second signal during a specified time interval.

19. The method of claim 18, wherein
  the group of users are scheduled users, and
  the time-aligning further includes transmitting one of a time-advance or time-delay command to scheduled users of the group transmitting one of the concurrent high data rate user transmissions.

20. The method of claim 19, wherein the time-advance and time-delay commands accompanies a scheduling grant message for the group.

21. The method of claim 1, wherein the frame is received over a reverse supplemental channel (R-SCH) as a plurality of encoder blocks with the control preamble, each encoder block including a cyclic redundancy code (CRC) to indicate which encoder blocks have been decoded correctly or incorrectly, the method further comprising:
  issuing a response message requesting re-transmission of only those encoder blocks of the frame that have been incorrectly decoded, the re-transmitted encoded blocks to be received with a next frame on the R-SCH.

22. A method of decoding a group of received user transmissions for canceling interference therein, comprising:
  selecting a highest data rate user transmission of the group from a received first signal containing the group's transmissions, the highest rate user transmission representing a second signal that is configured as one or more received frames, each frame including a control preamble and a plurality of encoded sub-frames;
  first decoding the control preamble in a first timeslot to determine a channel phase and gain estimate for a first one of the plurality of encoded sub-frames; and
  second decoding the first encoded sub-frame in a next timeslot using the determined channel phase and gain estimate to provide a revised channel phase and gain estimate, the second decoding repeated for remaining encoded sub-frames using determined channel phase and gain estimates from all previously decoded sub-frames.

23. The method of claim 22, wherein
  a portion of the second signal is re-formed incrementally as each sub-frame is decoded, and
  the portion is subtracted from the received first signal.

24. The method of claim 23, wherein the subtracting of the second signal yields a modified first signal including all remaining voice and data transmissions of the group.

25. The method of claim 22, wherein the selecting further includes selecting and scheduling of a highest data rate user transmission on a per-base station receive antenna basis.

26. A method of encoding transmissions of a group of users within a communication system for canceling interference therein, comprising:
  configuring a transmission as one or more frames to be carried over a communication channel, each frame further configured to include a control preamble and a plurality of separately encoded sub-frames, and
  transmitting the frames over the communication channel, with the control preamble of the frames to be first decoded in a first timeslot to determine a channel phase and gain estimate for a first one of the plurality of sub-frames and the first sub-frame to be second decoded in a next timeslot using the determined channel phase and gain estimate to provide a revised channel phase and gain estimate, the second decoding to be repeated for remaining sub-frames using determined channel phase and gain estimates from all previously decoded sub-frames.

27. The method of claim 26, wherein each frame is carried over a reverse supplemental channel (R-SCH) as a control preamble and a plurality of encoder blocks, each encoder block including a cyclic redundancy code (CRC) to indicate which encoder block has errors, the method further comprising:
  re-transmitting only those encoder blocks of the frame that contain errors with a next frame on the R-SCH.

28. A method of canceling interference in transmissions encoded in accordance with the method of claim 26 that are received from a group of users in a communication system, comprising:
  selecting a highest data rate user transmission of the group from a received first signal containing the group's transmissions, the highest rate user transmission representing a second signal that is configured as one or more frames, each frame including a control preamble and a plurality of sub-frames;
  decoding the control preamble and a plurality of encoded sub-frames on a sub-frame basis; and
  removing interference due to the highest rate user transmission from the first signal using the decoded sub-frames.

29. A method of decoding a group of received user transmissions encoded in accordance with the method of claim 26 for canceling interference therein, comprising:
  selecting a highest data rate user transmission of the group from a received first signal containing the group's transmissions, the highest rate user transmission representing a second signal that is configured as one or more frames, each frame including a control preamble and a plurality of sub-frames.

* * * * *